3,462,284
PRESSURE SENSITIVE ADHESIVE
Leonard R. Vertnik, Minneapolis, Minn., assignor to General Mills, Inc., a corporation of Delaware
No Drawing. Filed Nov. 16, 1966, Ser. No. 594,687
Int. Cl. C08h 9/00
U.S. Cl. 106—219                                    4 Claims

ABSTRACT OF THE DISCLOSURE

This invention relates to a pressure sensitive adhesive composition including a pressure sensitive adhesive component which is the diethylene triamine polyamine of a polymeric fat acid having a dimeric fat acid content of not less than 80% by weight and an amine to carboxyl ratio being greater than 1.55:1 and less than 1.7:1.

---

This invention relates to pressure sensitive adhesives and in particular to an article of manufacture of a supporting stock coated with a pressure sensitive polymeric fat acid polyamide adhesive.

The invention finds utility in the production of labels, tags, tape, etc. which have an adhesive layer which permits attachment by pressure to a wide variety of surfaces. Illustrative of this utility includes labels to mark and seal food packages, small labels and tags for indicating prices and contents of packages, adhesives for fabrication of containers of various kinds from various materials, and tapes for sealing cartons.

The pressure sensitive which is applied to the substrate stock in this invention is a polyamide of diethylene triamine and a polymeric fat acid having a dimeric fat acid content by weight of not less than 80% and preferably in excess of 90%. The diethylene triamine is employed in an amount so that the ratio of equivalents of amine to carboxyl groups is greater than 1.55:1 and less than 1.7:1. If a ratio of 1.55:1 or less is employed, a gel forms and the product is unsuitable. The preferred ratio is about 1.6:1.

The polyamide is prepared under conventional amidification procedures which are well known. In general, in such amidification reaction the polyamide forming reactants are preferably heated to a temperature of between 100 and 300° C. and the water of reaction is removed.

The polymeric fat acids are well known. A summary of the preparation thereof is found in U.S. Patent 3,157,681. Commercially available polymeric fat acids so prepared from tall oil fatty acids generally have a composition as follows:

| | Percent by wt. |
|---|---|
| $C_{18}$ monobasic acids (monomer) | 5–15 |
| $C_{36}$ dibasic acids (dimer) | 60–80 |
| $C_{54}$ and higher polybasic acids (trimer) | 10–35 |

The relative ratios of monomer, dimer and trimer in such unfractionated polymeric fat acids are dependent on the nature of the starting material and the conditions of polymerization. For the purposes of this invention, the term "monomeric fat acids" refers to the unpolymerized monomeric acids, the term "dimeric fat acids" refers to the dimeric fat acids, and the term "trimeric fat acids" refers to the residual higher polymeric forms consisting primarily of trimer acids but containing some higher polymeric forms. The term "polymeric fat acids" as used herein is intended to be generic to polymerized acids obtained from "fat acids" and consists of a mixture of monomeric, dimeric and trimeric fat acids. The term "fat acids" is intended to include saturated, ethylenically unsaturated and acetylenically unsaturated, naturally occurring and synthetic monocarboxylic aliphatic acids containing from 8 to 24 carbon atoms.

The saturated fat acids are generally polymerized by somewhat different techniques than those described in U.S. Patent 3,157,681, but because of the functional similarity of the polymerization products, they are considered equivalent to those prepared by the methods described as applicable to the ethylenically and acetylenically unsaturated fat acids. While saturated acids are difficult to polymerize, polymerization can be obtained at elevated temperatures with a peroxidic catalyst such as di-t-butyl peroxide. Because of the generally low yields of polymeric products, these materials are not currently commercially significant. Suitable saturated fat acids include branched and straight chain acids such as caprylic acid, pelargonic acid, capric acid, lauric acid, myristic acid, palmitic acid, isopalmitic, stearic acid, arachidic acid, behenic acid and lignoceric acid.

The ethylenically and acetylenically unsaturated fat acids which may be polymerized and their method of polymerization are described in the above-mentioned U.S. Patent 3,157,681.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or hightr polymeric fat acids, often referred to as trimer, present in polymeric fat acids may be determined by conventional gas-liquid chromatography of the corresponding methyl esters. Another method of determination is a micromolecular distillation analytical method. This method is that of R. F. Paschke et al., J. Am. Oil Chem. Soc., XXXI (No. 1), 5, (1954), wherein the distillation is carried out under high vacuum (below 5 microns) and the monomeric fraction is calculated from the weight of product distilling at 155° C., the dimeric fraction calculated from that distilling between 155° C. and 250° C., and the trimeric (or higher) fraction is calculated based on the residue. Unless otherwise indicated herein, the gas-liquid chromatography analytical method was that employed in the analysis of the polymeric fat acids employed in this invention. When the gas-liquid chromatography technique is employed, a portion intermediate between monomeric fat acids and dimeric fat acids is seen, and is termed herein merely as "intermediate," since the exact nature thereof is not fully known. For this reason, the dimeric fat acid value determined by this method is slightly lower than the value determined by the micromolecular distillation method. Generally, the monomeric fat acid content determined by the micromolecular distillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

As earlier indicated, the polymeric fat acids employed to prepare the polyamides used in this invention have a dimeric fat acid content in excess of 80% by weight and preferably in excess of 90% by weight. Such polymeric fat acids are obtained by fractionation by suitable means such as high vacuum distillation or by solvent extraction techniques from polymeric fat acids having lower dimeric fat acid conents, such as the common commercially available products described earlier.

The polyamides are prepared by reacting the polymeric fat acids with the triamine. The resins may also include other copolymerizing acid and amine components. In addition, small amounts of monomeric monocarboxylic acids may be present. With regard to any of the acid, components, any of the equivalent amide-forming derivatives thereof may be employed, such as the alkyl and aryl esters, preferably alkyl esters having from 1 to 8 carbon atoms, the anhydrides or the chlorides.

The copolymerizing amine components employed may be aliphatic, cycloaliphatic or aromatic diprimary diamines or polyamines which may be ideally represented by the formula $$H(HN-R)_n-NH_2$$

where R is an aliphatic, cycoaliphatic or aromatic radical preferably having from 2 to about 40 carbon atoms and $n$ is a whole integer of from 1 to 4. While R is preferably a hydrocarbon radical, R may contain ether linkages such as in diamines prepared from diphenyl ether sometimes called diphenyl oxide. R may also be saturated or unsaturated, straight or branched chain. Representative of such copolymerizing amine components are the alkylene diamines having from 2 to 20 carbon atoms (preferably 2–6) such as ethylene diamine, 1,2-diamino propane, 1,3-diamino propane, 1,3-diamino butane, tetramethylene diamine, pentamethylene diamine, hexamethylene diamine, decamethylene diamine, and octadecamethylene diamine; polyalkylene (preferably 2–6 carbon atoms) polyamines such as triethylene tertamine and tetraethylene pentamine and the corresponding propylene and butylene compounds; metaxylylene diamine, paraxylylene diamine, cyclohexylene diamine, bis($\beta$-aminoethyl)-benzene, cyclohexane-bis (methyl amine), diaminodicyclohexylmethane, methylene dianiline, bis(aminoethyl) diphenyl oxide, and dimeric fat diamine. The copolymerizing amine component may be a single compound or mixtures of two or more may be employed. The most preferred are the alkylene diamines or polyamines in which the alkylene group has from 4–6 carbon atoms and mixtures thereof with dimeric fat diamine (preferably having 36 carbon atoms). Preferably no more than 10 amine equivalent percent will be employed of this other copolymerizing amine, the remainder of the amine groups being employed being accounted for by the diethylene triamine.

The dimeric fat diamine, sometimes referred to as "dimer diamine," "dimeric fat amine," or "polymeric fat acid diamine" are the diamines prepared by amination of dimeric fat acids. Reference is made thereto in U.S. Patent 3,010,782. As indicated therein, these are prepared by reacting polymeric fat acids with ammonia to produce the corresponding nitriles and subsequently hydrogenating the nitriles to the corresponding amines. Upon distillation, the dimeric fat diamine is provided which has essentially the same structure as a dimeric fat acid except that the carboxyl groups are replaced by $-CH_2NH_2$ groups. Further, this diamine is also described in Research and Development Products Bulletin, CDS 2–63 by General Mills, Inc., June 1, 1963, as "Dimer Diamine" illustrated by the formula $H_2N-D-NH_2$ where D is a 36-carbon hydrocarbon radical of a dimeric fat acid.

The copolymerizing acid compounds commonly employed are aliphatic, cycloaliphatic or aromatic dicarboxylic acids or esters which may be defined ideally by the formulae:

$$R_1OOC-COOR_1$$

and $$R_1OOC-R'-COOR_1$$

where R' is an aliphatic, cycloaliphatic or aromatic hydrocarbon radical preferably having from 1 to 20 carbon atoms (the most preferred being where R' is an alkylene radical having from 6–12 carbon atoms) and $R_1$ is hydrogen or an alkyl group (preferably having from 1 to 8 carbon atoms). Illustrative of such acids are oxalic, malonic, adipic, sebacic, suberic, pimelic, azelaic, succinic, glutaric, isophthalic, terephthalic, phthalic acids, benzenediacetic acid, naphthalene dicarboxylic acids and 1,4- or 1,3-cyclohexane dicarboxylic acid. It is preferred that no more than 10 acid equivalent percent be attributable to the copolymerizing acid compound, the remainder being accounted for by the polymeric fat acid.

The polyamide adhesive of this invention is an unusual polymeric material. It possesses the properties of both a liquid and a solid, i.e. at room temperature it shows cold flow, yet is quite viscous at elevated temperatures (viscosity of about 30–50 poises at 205° C.). The physical properties or characteristics of the resin, as well as its adhesive properties, can be varied by the ratio of amine to acid employed and by employing copolymerizing reactants to obtain a more fluid resin to almost a solid resin. In all cases, the resin shows its adhesive property by the difficulty experienced in attempting to remove it from any substrate with which it may come into contact. At room temperature, the resin has definite elastic properties and a memory. The resin when pulled will stretch, but upon release will return to almost its original position, yet if left in a lump it will gradually flow.

The particular substrate to which the pressure sensitive adhesive is applied is not critical and any substrate to which the adhesive can be bonded is suitable. Illustrative of such substrates are wood, paper, metals, particularly foils thereof such as aluminum, tin, steel; and ceramic and plastics such as polyethylene, polypropylene, polyvinyl, nylon, Mylar, cellophane, and Tedlar.

The adhesive applied to the substrate may consist of the polyamide resin itself or the substantially neutral dicarboxylic acid salt may be employed. The dicarboxylic acids which may be employed are the same dicarboxylic acids defined above which may be employed as copolymerizing acids. While the full neutral salt is preferred, the degree of neutralization is not critical and a slight unbalance on the acid or alkaline side does not affect bond strength.

Optionally, plasticizers may be employed. Illustrative of the classes of plasticizers which may be employed are sulfonamides, fatty (8–24 carbon atoms) amines, polyamines and polymeric secondary amines, polychlorinated polyphenyls, polymeric fat acids, esters thereof and aminopolyamides thereof. Specifically illustrative plasticizers are Santicizer #8 (a mixture of N-ethyl-ortho and paratoluenesulfonamides), dimer diamine, polymerized tall oil fatty acids, and the alkyl (1–4 carbon) esters thereof. The acids are reactive plasticizers and may be employed to form the fully neutral salt or only partially neutralized salt. Plasticizers are particularly suitable to decrease the bond strength wherever lower bond strength is desirable, in view of the unusually high bond strength of the polyamide products themselves. The plasticizer where employed is most desirably used in an amount up to 90% by weight based on polyamide resin and preferably about 5 to 50% is employed.

The adhesive may be applied to the substrate by any suitable technique. In addition to application as a hot melt, due to its thermoplastic characteristics, it may be applied in the form of a solution or dispersion by any number of methods including spraying, brushing, blading, calendering, and the like.

The invention can best be illustrated by means of the following examples in which all parts and percentages are by weight unless otherwise indicated.

STANDARD PROCEDURE FOR PREPARATION OF ADHESIVE RESIN

Into a reactor equipped with thermometer, stirrer and distillation head is placed the polymeric fat acid. After heating the contents to 60° C., the diethylene triamine is added. The temperature is gradually raised over a period of two hours to 205° C. during which time most of the water of reaction is removed. The temperature of 205° C. is maintained for two hours. Water pump vacuum is then applied (about 15 mm. Hg) and held at 205° C. for an additional two hours. The resulting product is then cooled and recovered.

Example I

The adhesive properties of resins were determined according to ASTM Method D 1876–61T "Method of Test for Peel Resistance of Adhesives" (T-Peel Test).

Briefly, this procedure involves applying a desired resin film thickness, using a solution of the resin as 35% N.V. in 95% n-propanol, onto the substrate (polyethylene The resulting resin had the following analysis:

Amine No. ------------------------------------ 106.2
Acid No. ------------------------------------- 0.6
Amino-Amide No. ------------------------------ 85.5
Imidazoline No. ------------------------------ 81.8
Viscosity at 205° C. ------------------poises-- 30

Resin B

Resin B used in Samples 5, 6, 7, 8, and 9 was prepared exactly as Resin A above. The resulting resin had the following analysis:

Amine No. ------------------------------------ 102.9
Acid No. ------------------------------------- 1.9
Amino-Amide No. ------------------------------ 91.2
Imidazoline No. ------------------------------ 89.4
Viscosity at 205° C. ------------------poises-- 28

Resin C

Same as Resin B above except 5 g. of sebacic acid were dissolved in 27 g. of the resin. This system was used in Samples 3, 4, 12, and 13.

In all samples, a plasticizer was employed. The plasticizer was Santicizer #8 (a mixture of N-ethyl-ortho and para-toluenesulfonamides). The results can be seen in Table I.

TABLE 1

| Sample | Adhesive Thickness (mil) | Percent Plasticizer* | Peel Strength lbs./in. at | | Type of Failure | | Hand Testing-Failure | | Substrate |
|---|---|---|---|---|---|---|---|---|---|
| | | | 2 in./min. | 10 in./min. | 2 min. | 10 min. | Slow | Fast | |
| 1 | 1 | 10 | 3.3 | 4.5 | C | C | C | C-S | TPE, 4 mil (Dow Chem.). |
| 2 | 1.7 | 10 | 3.8 | 5.4 | C | C | C | C-S | |
| 3 | 1 | 10 | 5.2 | 6.1 | C-S | C-S | C-S | C-T | |
| 4 | 1.7 | 10 | 6.0 | 6.6 | C-S | C-S | C-T | C-T | |
| 5 | 1 | 5 | 3.3 | 4.3 | C | C | S-T | S-T | |
| 6 | 1 | 10 | 3.6 | 4.5 | C | C | S-T | S-T | |
| 7 | 1 | 15 | 3.6 | 3.4 | C | C | S-T | S-T | |
| 8 | 1 | 20 | 3.1 | 4.0 | C | C | S-T | S-T | |
| 9 | 1 | 40 | 1.6 | 3.2 | C | C | C-S-T | C-S-T | |
| 10 | 1 | 10 | 3.4 | 3.3 | C-S-T | C-S-T | S | T | TPE, 2 mil (Dow Chem.). |
| 11 | 1.7 | 10 | 3.4 | 3.2 | C-S-T | C-S-T | S | T | |
| 12 | 1 | 10 | 3.5 | 3.8 | C-S-T | C-S-T | T | T | |
| 13 | 1.7 | 10 | 3.5 | 3.4 | T | T | T | T | |
| 14 | 1.7 | 10 | 3.3 | 1.5 | C | A | A | A | Mylar, 3 mil. |
| 15 | 1.7 | 10 | 3.2 | 2.0 | C | A | A | A | Mylar, 3 mil; retreated with Hercules Hercoprime 15X. |
| 16 | 1.7 | 10 | 3.5 | 3.6 | C-S-T | A-S | A | A | PE, 2 mil, untreated; pretreated with Hercules Hercoprime 15X. |
| 17 | 1.7 | 5 | 2.0 | 2.2 | A-T | T | | | TPE, 2 mil. |
| 18 | 1.7 | 5 | 0.1 | 0.1 | A-S | A-S | | | PE, 2 mil; untreated side. |
| 19 | 1.7 | 10 | 2.1 | 2.4 | A-T | T | | | TPE, 2 mil. |
| 20 | 1.7 | 10 | 0.2 | 0.3 | A-S | A-S | | | PE, mil; untreated side. |

* By weight of adhesive solution.
NOTE.—C=Cohesive failure; S=Polyethylene stretched; T=Polyethylene tears; A=Adhesive failure; TPE-treated polyethylene.

film 1 inch wide was used in all cases). The solvent was allowed to evaporate and a second polyethylene film was applied directly on the film containing the adhesive. The peel strength of the resulting sample was determined by hand and by employing a Table Model Instron Tester. The latter was used to determine properties at a rate of pull of 2 in./min. and 10 in./min. These data are reported in Table 1 appended.

The resins evaluated in this example were as follows:

Resin A

Resin A used in Samples 1, 2, 10, 11, 14, 15, 16, 17, 18, 19, and 20 was prepared from diethylene triamine according to the standard procedure using a carboxyl to amine ratio of 1:1.62. The polymeric fat acid (polymerized tall oil fatty acids) used in the preparation had the following analysis:

Percent M ------------------------------------ 1.9
Percent L ------------------------------------ 2.6
Percent D ------------------------------------ 92.5
Percent T ------------------------------------ 3.1
AV ------------------------------------------- 193
SV ------------------------------------------- 199

The foregoing illustrates that the optimum amount of plasticizer is about 5 to 20% by weight based on the 35% N.V. adhesive resin solution for maximum bond strength. Higher levels of plasticizer can be employed to provide a lower range of adhesive bond strengths. The data further illustrate that the dicarboxylic acid neutral salt provided improved results over the use of resin alone.

Example II

In this example, the two adhesive systems were studied in more detail, namely (A) the resin (A of Example I) itself and (B) the sebacic acid neutral salt thereof. Only the adhesion to synthetic films are presented herein to illustrate the adhesive strength inasmuch as adhesion to such synthetic films represents the most difficult bonding application. Adhesion to other substrates such as paper, wood, and metallic substrates such as aluminum or tin foil, is very good.

Adhesive solutions were prepared by heating the resin (or the resin and sebacic acid in the case of the salt) in a solvent (95% aqueous n-propanol) to provide a 35% solids solution. A plasticizer (Santicizer #8) was added in amount of 10 parts by weight per 100 parts by weight of solution.

The results can be seen from the following Table II.

TABLE II.—NON-AGED ADHESIVE STRENGTHS [1]

| Film | | A Type | | B Type, Sebacic Salt | |
| --- | --- | --- | --- | --- | --- |
| Type | Thickness, mils | Ld., #/in. | Type of Failure | Ld., #/in. | Type of Failure |
| Treated Polyethylene to Treated Polyethylene. | 4 | 4.5 | C | 6.1 | Film tore. |
| Treated Polyethylene to Untreated Polyethylene. | 2 | <0.2 | A | <0.2 | A. |
| Mylar | 3 | 1.3 | A | 1.4 | A. |
| Treated Linear Polyethylene | 1.5 | 1.3 | A | 2.1 | A. |
| Cellophane | 1 | 1.9 | A | 2.1 | A. |
| Treated Polypropylene | 2 | 3.5 | C+A | 4.4 | C, A; film tore. |
| Treated High Slip Polyethylene | 3 | 0.2 | A | 0.3 | A. |
| Saran | 2 | 1.9 | Film tore | 3.8 | C+A. |

| | Minnesota Mining "Scotch Tape" Adhesives [2] | |
| --- | --- | --- |
| | Cellophane Type | Magic Mending Type |
| Treated Polyethylene | 0.6 A | 0.7 A. |
| Untreated Polyethylene | <0.4 A | <0.2 A. |

[1] Procedure.—Adhesive coated on test material to give 1 mil layer upon evaporation of solvent. Air dried 8 hours before bonding to another piece of same material. Tested bond strength with T-peel test specimens using the Instron at 10 inch per minute bond separation. Strength reported in lbs. per inch of adhesive width.
[2] This data was included for comparison.
C=cohesive; A=adhesive bond failure.

Example III

Aging tests were also conducted using the same products of Example II.

The adhesive was applied to the treated side of polyethylene and two types of bonds were made; T—A—T, i.e., treated polyethylene to the adhesive-treated polyethylene and U—A—T, i.e., untreated polyethylene to the adhesive-treated polyethylene. The latter makes a strippable bond, such as is found in a roll of "Scotch-tape." This was done to protect the adhesive layer during aging tests. At various time intervals, the U—A—T bonds were opened, the U-polyethylene reversed and rebonded to give a T—A—T bond. Both types of T—A—T bonds (one aged and the other freshly bonded after aging as a strippable bond) were tested on the Instron for peel strength, type of failure, etc. Hand pulls, both slow and fast were made to see if the bonds would strip.

The results after 24 weeks:

(A) Aged-bond (T—A—T):

(1) The non-salt, (A) type, adhesive shows essentially no loss in bond strength.

(2) Although the (B) form had higher initial bond strengths, aging resulted in a gradual loss in strength so that it reached about the same level as the (A) type.

(3) Hand pull tests, slow or fast, cause no bond failure;

(4) With machine testing, bonds show cohesive failure.

(B) Scotch-tape type resealable bond (U—A—T to T—A—T):

(1) The values are slightly lower than with the regular aged bonds.

(2) Again, the (B) type starts higher, but gradually decreases in bond strength with age until it has no advantage over the (A) type adhesive after 24 weeks.

(3) Hand pull tests show the (A) type adhesive to be stronger, with polyethylene tearing, while the (B) type shows adhesive failure.

(4) Machine testing again shows the type (A) adhesive to be better, with cohesive failure; the (B) type shows some stripping (adhesive failure) after 24 weeks, but at 8 weeks it was much like the (A) type.

The following Table III summarizes the results:

TABLE III.—AGED ADHESIVE BONDS, INSTRON TEST RESULTS, LBS./IN.

| | Bond Type | | | |
| --- | --- | --- | --- | --- |
| | T-A-T | | U-A-T to T-A-T | |
| Adhesive Type | (A) | (B) | (A) | (B) |
| Time, weeks: | | | | |
| Initial | 4.5, C | 6.1, C | | |
| 1 | 4.6, C | 6.3, C | 4.5, C | 5.7, C. |
| 4 | 5.2, C | 6.7, C | 5.1, C | 6.3, C. |
| 8 | 4.7, C | 5.3, C | 3.3, A | 5.2, C. |
| 24 | 5.2, C | 5.3, C | 5.2, C | 4.2, A. |

Briefly, the results of all the testing can be summarized as follows:

(1) Strong bonds are obtained on treated polyethylene, cellophane, treated polypropylene and Saran. In many cases the bonds are resealable.

(2) Lower strength bonds are obtained with untreated polyethylene, treated linear polyethylene, treated high slip polyethylene and Mylar. However, such bonds were improved if untreated polyethylene is primed with Hercules' Hercoprime 15X, (2% polypropylene in xylene).

(3) Although the (B) form adhesive has higher initial values on treated polyethylene, both forms are equal in peel strength after 6 months bond aging. The (A) form shows no change in bond strength with age.

(4) Simulated "Scotch Tape" tests on treated polyethylene with the (A) adhesive after six months aging show no decrease in rebonding ability while the (B) form definitely shows a decrease in peel strength upon rebonding.

(5) Both resin-adhesive forms have good hand peel—even with aged bonds on treated polyethylene.

(6) The best overall adhesive is the (A) form. It appears to give more stable bonds. The (B) form, although poorer in bond stability, is still good and would be less expensive to compound than the (A) form.

(7) When compared to the commercially available tape adhesives, Scotch Cellophane Tape and Magic Mending Tape, the adhesives of this invention are about 8 times stronger in bond strength. Consequently, they could be further plasticized to give lower peel strengths for selected uses.

Example IV

In this example were compared the results using a resin similar to resin A of Example I, designated herein as Resin X, the fully neutralized sebacic salt thereof and a blend of Resin X and another polymeric fat acid polyamide, designated herein as Resin Y.

Resin X was prepared using the same standard procedure earlier described from diethylene triamine and polymerized tall oil fatty acids having the following analysis:

Percent M _____ 1.5
Percent I _____ 4.6
Percent D _____ 90.6
Percent T _____ 3.3
A.V. _____ 195.7
S.V. _____ 198.7

The resulting product had the following properties:

Amine No. _____ 103.9
Acid No. _____ 2.3
Amino-amide No. _____ 76.8
Imidazoline No. _____ 79.3
Viscosity at 205° C. _____poises__ 48

Resin Y was prepared from 22.54 lbs. sebacic acid, 10.54 lb. ethylene diamine, 36.19 lbs. 1,3-di(4-piperidyl) propane and 125 lbs. polymerized tall oil fatty acids having the following analysis:

| | |
|---|---|
| Percent M | 1.3 |
| Percent I | 4.6 |
| Percent D | 91.2 |
| Percent T | 2.9 |
| A.V. | 195.5 |
| S.V. | 198.4 |

In the preparation of this product, the temperature was raised to 250° C. over 2 hours, the temperature of 250° C. was maintained for 2 hours under nitrogen and followed by another two hours under vacuum (15 mm. Hg). Upon cooling the product was recovered which had the following analysis and properties:

| | |
|---|---|
| Amine No. | 8.3 |
| Acid No. | 0.5 |
| Melting point, ball & ring ° C. | 140 |
| Melt viscosity, 99 poises at ° C. | 225 |
| Tensile strength p.s.i. | 736 |
| Elongation percent | 937 |

The adhesive strength of these systems was tested on untreated polyethylene, treated polyethylene and vinyl before and after immersion in water at room temperature and at 140° and 190° F. Also the effect of room temperature and 150° F. bonding was compared. Details and comments follow.

PROCEDURE

Resin X and Resin Y combinations were put into solution by refluxing the resins with 95% n-propanol (5% water) to give 35% solids. The solutions (in some cases were warmed for better flow) were coated on the test films using a 3 mil doctor blade to give a 1 mil adhesive layer after solvent evaporation. The coated films were air dried overnight before contacting with a similar, but uncoated film surface. A 1″ diameter rubber roller was used to insure good initial contact. The bonded films were cut into 1″ wide strips. A portion of each type was heat sealed at 150° F. by momentary slight contact pressure in a 150° F. Pasadena Press. The film strips were then subjected to the environmental conditions described in the table and tested immediately after environmental exposure for "T" peel strength using a jaw separation rate of 20″/minute (adhesive layer separation of 10″/minute). The bonded films immersed in water were tested wet.

RESULTS

Part A.—Adhesive Strengths, in p.s.i. of Resin X Alone and its Sebacic Acid Salt [1]

| Adhesive | Film [2] | Roller Contact at 75° F. | Heat Seal at 150° F. plus Water Immersion | | | |
|---|---|---|---|---|---|---|
| | | | 0 hrs. | 24 hrs. at 75° F. | 2 hrs. at 140° F. | 2 hrs. at 190° F. |
| Resin X Alone | U/U | 0.5 | 0.7 | 2.0 | 1.7 | 1.8 |
| | T/T | 3.6 | 3.6 | 4.5 | 4.2 | 2.8 |
| | V/V | 3.3 | 5.2 | 4.8 | 6.2 | 6.4 |
| Sebacic Acid Salt of Resin X. | U/U | 0.3 | 0.4 | 3.5 | 3.0 | 2.6 |
| | T/T | 3.1 | 2.8 | 4.7 | 4.0 | 3.5 |
| | V/V | 4.4 | 5.4 | 4.8 | 5.6 | 5.9 |

[1] Santicizer #8, a plasticizer, was added to the solutions before coating at 10% by wt.
[2] U/U=Untreated polyethylene to untreated polyethylene. T/T=Treated polyethylene to treated polyethylene. V/V=Vinyl to vinyl (a composite wrap consisting of 3.0 mils vinyl, 0.35 mil aluminum, 0.5 mil Mylar).

The foregoing illustrates the following:

(1) U/U adhesion is low both on roller contact and use of heat, however, exposure to water gives markedly improved bond strength. The salt version is better than the straight resin.

(2) T/T and V/V shows again that immersion in water actually improved bond strength. Heat sealing improves bond strength on vinyl most (possibly vinyl is softening). The salt version of the adhesive appears to be slightly better overall.

Part B.—Resin X+Resin Y Adhesive Blends "T" Peel Strength, p.s.i.

| Blend by weight, Resin X: Resin Y | Film | Roller Contact at 75° F. | Heat Seal at 150° F. plus Water Immersion | | | |
|---|---|---|---|---|---|---|
| | | | 0 hrs. | 24 hrs. at 75° F. | 2 hrs. at 140° F. | 2 hrs. at 190° F. |
| 1:1 | U/U | <0.1(0.2) | 0.1(0.3) | 0.1(0.6) | 0.2(0.5) | 0.6(6.7) |
| | T/T | 1.3(2.3) | 1.9(2.6) | 1.9(3.2) | 2.3(2.8) | 2.1(2.3) |
| | V/V | 3.0(3.4) | 4.3(3.6) | 3.1(4.2) | 3.9(4.9) | 10.3(7.4) |
| 2:1 | U/U | <0.1(0.1) | 0.2(0.2) | 0.1(0.3) | 0.2(0.3) | 0.7(0.7) |
| | T/T | 1.4(2.2) | 2.1(2.6) | 2.5(3.1) | 2.5(3.0) | 2.2(2.6) |
| | V/V | 3.1(3.1) | 4.1(3.2) | 2.2(3.7) | 4.4(3.6) | 8.2(8.2) |
| 1:2 | U/U | <0.1(0.3) | 0.1(0.3) | 0.1(1.1) | 0.2(0.7) | 0.6(1.3) |
| | T/T | 1.1(2.7) | 1.6(3.0) | 1.7(4.8) | 2.0(3.3) | 2.0(2.2) |
| | V/V | 2.0(3.4) | 4.1(4.2) | 3.9(4.7) | 2.7(4.6) | 10.1(7.8) |

Note.—Values in ( ) result when 10% by weight Santicizer #8, a plasticizer, is added to adhesive solution before coating.

The foregoing illustrates the following:

(1) The U/U adhesion is lower in all cases than T/T.

(2) Adhesive strength is improved in all cases by addition of Santicizer #8, especially with higher use level of Resin Y.

(3) Peel strengths are lower with Resin Y containing adhesive than with Resin X alone or as the salt except when exposed to 190° F. water for 2 hours. The later temperature of 190° F. would indicate that a better bond could be achieved with a higher activation temperature than 150° F. used in heat sealing.

(4) For the T/T and V/V films all show good initial tack strength upon roller contact. Heat sealing at 150° F. improves the peel strength by 50–100%.

(5) For heat-sealed bonds, immersion in 75° F. water for 24 hours actually decreased peel strength, but warm water improves peel strength especially for V/V films. The later temperature of 190 F. would indicate that a better bond could be achieved with a higher activation temperature than 150° F. used in heat sealing.

The pressure sensitive adhesive may be further formulated with other products such as thermoplastics resins, elastomers, plasticizers, and tackifiers to provide a wide variety of properties. Particularly desirable thermoplastic resins are the polyamides of polymeric fat acids having a dimeric fat acid content in excess of 80% by weight with diamines such as ethylene diamine, diamino propane, hexamethylene diamine, etc. as earlier described hereinabove. Elastomers such as commercially available synthetic rubbers are illustrative of the elastomeric compounding agents. Illustrative tackifiers are the modified and unmodified rosin esters such as the glycerol ester of rosin and maleic modified rosin esters. Also included are the pentaerythritol esters of hydrogenated rosin, dimeric resin acids, and polymerized rosin. Also illustrative are the hydrogenated methyl ester, diethylene glycol ester, ethylene glycol ester, triethylene glycol ester and glycerol esters of polymerized rosin or hydrogenated rosin. Other illustrative resins are the polymerized polyterpene resins.

The following data will illustrate some formulations using the pressure sensitive adhesive of this invention as the base resin. Unless otherwise stated, the adhesive was dissolved in 95% isopropanol to provide a 35% solids solution and coated on synthetic films to provide an adhesive layer 1 mil in thickness upon evaporation of the solvent. The coated films were allowed to dry overnight before bonding to other materials. Testing was done using the procedure described in the Test Methods for Pressure Sensitive Tapes developed by the Specifications and Technical Committee of the Pressure Sensitive Tape Council (PSTC), Glenview, Ill. The peel strength specimens were one inch wide and the bond was separated at 180° C. at a bond separation rate of 10 inches per minute for all tests except shear, where a rate of 0.5 inches per minute was employed, using an Instron Tester. In the data to follow, the following abbreviations are employed.

PS—Pressure sensitive
T—Tacky
TP—Thermoplastic
NT—Not tacky
RBT—Rolling Ball Tack (PSTC-18) expressed in inches of roll
Initial value—Peel strength of an adhesive by single contact pressure and 4½ lb. roller weight. No heating
PVF—Polyvinyl fluoride (Tedlar)
PP—Polypropylene
PE—Polyethylene (with prefix T means treated polyethylene)

In all the data the base resin was prepared using the standard procedure described from polymerized tall oil fatty acids (percent M—1.5; percent I—4.6; percent D—90.6; percent T—3.3; A.V.—195.7; S.V.—198.7) and diethylene triamine (carboxyl to amine ratio of 1:1.6) to provide a resin product of the following analysis:

Amine No. _____ 103.9
Acid No. _____ 2.3
Amino Amide No. _____ 76.8
Imidazoline No. _____ 79.3
Melt viscosity at 205° C. _____poise__ 48.2

TABLE IV.—PS AND TP

| Adhesive Composition | | | Peel strength, lbs./inch | | | |
|---|---|---|---|---|---|---|
| Base Resin, Parts by weight 35% solids solution | Plasticizer,[1] percent by weight based on solution | Thermoplastic Resin,[2] Parts by weight 35% solids solution | PVF/PVF | | TPE/TPE | |
| | | | Initial | Heat sealed 175° F. | Initial | Heat sealed 150° F. |
| 2 | 10 | 1 | 5.4 | 5.3 | 2.2 | 2.6 |
| 1 | 10 | 1 | 8.7 | 10.0 | 2.3 | 2.6 |
| 1 | 10 | 2 | 3.9 | 6.2 | 2.7 | 3.0 |

[1] Mixture of N-ethyl-ortho and para-toluenesulfonamides.
[2] Prepared per standard procedure described from 250 lbs. of polymerized tall oil fatty acids (percent M—1.3; percent I—4.6; percent D—91.2; percent T—2.9; A.V.—195.5; S.V.—198.4), 44.6 lbs. of sebacic acid, 21.4 lbs. of ethylene diamine and 73.3 lbs. of 1,3-di-(piperidyl) propane.

TABLE V.—PS AND TP

| Adhesive Composition (same materials as Table IV) | | | Peel Strength (lbs./in.) PVF/PVF[2] | |
|---|---|---|---|---|
| Base Resin[1] | Thermoplastic Resin[1] | Plasticizer[1] | Initial | Heat Sealed at 165° F. |
| 1.25 | 1.0 | 10 | 5.7 | 5.7 |
| 1.5 | 1.0 | 10 | 5.3 | 5.5 |
| 1.0 | 1.0 | 10 | 4.6 | 5.8 |
| 1.0 | 1.25 | 10 | 3.7 | 5.5 |
| 1.0 | 1.5 | 10 | 3.2 | 5.0 |
| 1.0 | 2.0 | 20 | 3.1 | 4.5 |
| 1.0 | 2.0 | 10 | 1.9 | 4.9 |
| 1.0 | 1.0 | 20 | 3.9 | 3.9 |
| 1.0 | 1.0 | 15 | 3.8 | 3.7 |
| 1.0 | 1.0 | 5 | 4.3 | 6.4 |

[1] Same weight basis as Table IV.
[2] 2 mil PVF treated both sides for adhesion.

In order to illustrate a comparison with the resin of this invention and one prepared for a polymeric fat acid having a polymeric fat acid content less than 80% by weight, formulations were prepared using the base resin, thermoplastic resin and plasticizer employed in Tables IV and V, also with a comparative run substituting for the base resin, the one prepared from polymeric fat acids having a dimeric fat acid content less than 80%. On the same basis as set forth in Tables IV and V, 1 part of the base resin solution of this invention, 6 parts of the solution of the thermoplastic resin and 22% by weight of the solution of the plasticizer, the initial value was 0.7 and after heat sealing at 250° F. the value was 6.3. In comparison the other product with the same proportions of agents gave an initial value of 0.2 and after heat sealing of 3.5 on 2 mil films of PVF/PVF.

Among the various plasticizers discussed earlier hereinabove, dimer diamine was found to provide a system which was not tacky due to the formation of carbonates on exposure to air. However, by mechanical activation which breaks the skin of the adhesive layer, the adhesive was made pressure sensitive. A system of 3 parts by weight of the base resin employed in Table IV and 1 part of the diamine provided a product which was non-tacky to the touch but provided a peel strength of 2.1 lbs./in. when mechanically activated.

As indicated above, elastomers may be employed in combination with the base resin of this invention. Illustrative of one such product is a styrene-butadiene elastomer (Kraton 101). Using 1 part by weight of this product, 1 part by weight of the base resin (Table IV) and 1 part by weight of the sulfonamide plasticizer in toluene (25% solids) with a 0.75 mil adhesive film on treated polyethylene (TPE) bonded to TPE (4 mil films), the peel strength in lbs./in. was 1.5. Increasing the base resin content to 3 parts by weight provided a peel strength of 2.8 lbs./in. and increasing the elastomer content to 2 parts by weight with 2 parts by weight of base resin and 1 part by weight of plasticizer provided a peel strength of 3.4 lbs./in.

Adding tackifiers to the base resin will increase the tack to provide values in the rolling ball tack (RBT) test to below 6 inches, which is generally desirable for tacky adhesives. One of the preferred compositions consisted of 1.5 parts by weight of the base resin (of Table IV), 1 part by weight of the sulfonamide plasticizer and 0.5 parts by weight of the glycerol ester of hydrogenated rosin (as a tackifier). This product is a 35% solids solution on PVF films showed a peel strength of 2.7 (initial) and 2.8 lbs./in. after heat sealing at 250° F. In the RBT test (PSTC-18) the value was 4.5 inches. By varying the amounts of the base resin, plasticizer and stabilizer values from 0.5 to 7.5 inches were obtained. With the preferred formulation, the optimum adhesive thickness was about 1 mil when tested on 4 mil polyethylene.

The abovementioned preferred composition was tested in a 2 coat system whereby one coat of a thermoplastic resin, 0.75 mils thick, coated from a 25% solids solution was first laid on a PVF film followed by an overcoat of the preferred composition 0.2 mils thick, coated from a 35% solids solution. Various thermoplastic resins were employed. The results can be seen from the following Table VI which includes data for the one coat (1–C thermoplastic) as well as the two coat (2–C with overcoat).

TABLE VI

| Thermoplastic Resin | Peel Strength (lbs./in.) | | | |
|---|---|---|---|---|
| | Initial System | | Sealed at 250° F. | |
| | 1–C | 2–C | 1–C | 2–C |
| 1 | 0 | 4.3 | 3.5 | 4.5 |
| 2 | 0 | 1.4 | 0.5 | 1.8 |
| 3 | 0 | 4.8 | 3.5 | 4.7 |

The thermoplastic resins employed above were prepared using the standard procedure described above. Resins 1 and 2 were prepared from polymeric fat acids having the following analysis:

| | |
|---|---|
| Percent M | 2.3 |
| Percent I | 2.8 |
| Percent D | 91.4 |
| Percent T | 3.4 |
| A.V. | 188.4 |
| S.V. | 198.8 |

Resin 3 was the same resin employed in Table IV. Resin 1 was prepared from 1,3-diamino propane and Resin 2 from ethylene diamine to provide the following products:

| | Resin 1 | Resin 2 |
|---|---|---|
| Amine No | 4.6 | 7.0 |
| Acid No | 2.8 | 1.8 |
| Ball & Ring Softening Point, °C | 88 | 112 |

The foregoing summarizes a wide variety of pressure sensitive adhesive formulations. By formulation of the base resin, the properties can be varied from pressure sensitive and tacky to pressure sensitive and not tacky. The system may also be a thermoplastic adhesive system by compounding with thermoplastic resins. Two coat systems may be employed to provide the combination of pressure sensitive and thermoplastic adhesive properties. A wide variety of substrates may be employed. While plastic films are preferred substrates, the adhesive may also be employed on other substrates such as wood, metal and paper. Plastic film substrates will preferably have a thickness on the order of about 0.5–5 mils, and preferably from about 1 to 4 mils.

The preferred adhesive layer thickness is on the order of about 1–2 mils. However, other thicknesses higher and lower may be employed. Usually the adhesive layer will not be less than 0.2 mils or exceed 5 mils.

Using 1 part by weight of the pressure sensitive base resin of this invention, typical formulations of the various products would be as follows:

| | Parts by wt. |
|---|---|
| Thermoplastic adhesive | 0–3 |
| Plasticizer | 0–3 |
| Tackifier | 0–3 |
| Elastomer | 0–3 |

Typical preferred adhesive compositions of this invention dependent on the combination of properties desired would be as follows:

TABLE VII

| | Parts by weight | | | | | |
|---|---|---|---|---|---|---|
| | (1) | (2) | (3) | (4) | (5) | (6) |
| Base Resin | 1 | 1 | 1 | 1.5 | 1 | 1 |
| Thermoplastic adhesive | 0 | 0 | 0 | 0 | 0 | 1 |
| Plasticizer | 0 | 0.5 | 0.5 | 1 | 0 | 0.5 |
| Tackifier | 0 | 0 | 0 | 0.5 | 0.5 | 0 |
| Elastomer | 0 | 0 | 1 | 0 | 0 | 0 |

In addition to the compounds set forth above, it is understood that the compositions may also optionally include fillers, stabilizers and colorants or dyes, if desired.

The embodiments of the present invention in which an exclusive property or privilege is claimed are defined as follows:

1. In a pressure sensitive adhesive composition which includes a pressure sensitive adhesive component the improvement comprising employing as said pressure sensitive component the diethylene triamine polyamide of a polymeric fat acid having a dimeric fat acid content not less than 80% by weight, the amine to carboxyl ratio being greater than 1.55:1 and less than 1.7:1.

2. A pressure sensitive adhesive composition comprising:
   (1) 1 part by weight of a pressure sensitive adhesive component,
   (2) 0 to 3 parts by weight of a thermoplastic heat activated adhesive component,
   (3) 0 to 3 parts by weight of a plasticizer,
   (4) 0 to 3 parts by weight of a tackifier, and
   (5) 0 to 3 parts by weight of an elastomer
   said pressure sensitive adhesive component being the diethylene triamine polyamide of a polymeric fat acid having a dimeric fat acid content not less than 80% by weight, the amine to carboxyl ratio being greater than 1.55:1 and less than 1.7:1.

3. A pressure sensitive adhesive composition as defined in claim 2 wherein said polymeric fat acid is polymerized tall oil fatty acids.

4. A pressure sensitive adhesive composition as defined in claim 2 wherein said plasticizer is a mixture of N-ethyl-ortho and para toluenesulfonamides and said tackifier is a rosin ester.

References Cited

UNITED STATES PATENTS

| | | |
|---|---|---|
| 3,393,163 | 7/1968 | Vertnik et al. |
| 3,380,840 | 4/1968 | Harrison. |
| 3,297,730 | 1/1967 | Fischer et al. |
| 2,995,951 | 10/1960 | Aelony. |
| 2,839,219 | 6/1958 | Groves et al. |
| 2,607,711 | 8/1952 | Hendricks. |

OTHER REFERENCES

Thermo Plastic Versamid Polyamide Resins; Bulletin 11–B–1; General Mills; 1960; pages 10, 13.

DONALD E. CZAJA, Primary Examiner

C. WARREN IVY, Assistant Examiner

U.S. Cl. X.R.

106—243; 117—122; 161—227, 228; 260—18, 23.7, 404.5

PO-1050
(5/69)

UNITED STATES PATENT OFFICE
CERTIFICATE OF CORRECTION

Patent No. 3,462,284     Dated August 19, 1969

Inventor(s) Leonard R. Vertnik

It is certified that error appears in the above-identified patent and that said Letters Patent are hereby corrected as shown below:

```
Column 1, line 11, delete "pressure sensitive".
          line 13, delete "polyamine" and insert --polyamide--.
          line 31, after "sensitive" insert --adhesive--.
Column 2, line 35, delete "hightr" and insert --higher--.
Column 3, line 10, delete "conents" and insert --contents--.
Table I, under the heading Substrate, that portion reading
         "Mylar, 3 mil; retreated with Hercules Hercoprime 15X"
         should read --Mylar, 3 mil; pretreated with Hercules
         Hercoprime 15X-- and that portion reading "PE, mil;
         untreated side" should read --PE, 2 mil; untreated
         side--.
Column 6, line 74, before "amount" insert --an--.
Column 7, lines 48 and 49, after "failure;" insert --the poly-
                ethylene stretches, then tears for both types.-
Column 10, line 57, before "V/V" insert --the--.
           line 58, after "190" insert --°--.
           line 61, delete "thermoplastics" and insert
                    --thermoplastic--.
Column 14, line 41, delete "2,995,951" and insert --2,955,951--.
```

SIGNED AND
SEALED
MAY 19 1970

(SEAL)
Attest:

Edward M. Fletcher, Jr.
Attesting Officer

WILLIAM E. SCHUYLER, JR.
Commissioner of Patents